US008087015B2

(12) United States Patent
Pogrebinsky et al.

(10) Patent No.: US 8,087,015 B2
(45) Date of Patent: Dec. 27, 2011

(54) ASSIGNMENT OF APPLICATION MODELS TO DEPLOYMENT TARGETS

(75) Inventors: Vladimir Pogrebinsky, Sammamish, WA (US); Benjamin George Johnson, Seattle, WA (US); Nagalinga Durga Prasad Sripathi Panditharadhya, Sammamish, WA (US); Udaya Kumar Bhaskara, Redmond, WA (US); Daniel Eshner, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 1081 days.

(21) Appl. No.: 11/925,731

(22) Filed: Oct. 26, 2007

(65) Prior Publication Data

US 2009/0112966 A1    Apr. 30, 2009

(51) Int. Cl.
*G06F 9/44* (2006.01)
(52) U.S. Cl. .................. 717/172; 717/176; 717/177
(58) Field of Classification Search .............. None
See application file for complete search history.

(56) References Cited

U.S. PATENT DOCUMENTS

| | | | |
|---|---|---|---|
| 6,671,818 B1 | 12/2003 | Mikurak | |
| 7,072,807 B2 | 7/2006 | Brown et al. | |
| 7,124,101 B1 | 10/2006 | Mikurak | |
| 7,127,492 B1 | 10/2006 | Calo et al. | |
| 7,707,571 B1* | 4/2010 | Harris et al. | 717/177 |
| 7,757,214 B1* | 7/2010 | Palczak et al. | 717/121 |
| 7,814,190 B2* | 10/2010 | Kacin et al. | 709/223 |
| 2003/0018950 A1* | 1/2003 | Sparks et al. | 717/100 |
| 2004/0039815 A1* | 2/2004 | Evans et al. | 709/225 |
| 2004/0215791 A1 | 10/2004 | Tsao | |
| 2005/0005200 A1 | 1/2005 | Matena et al. | |
| 2005/0262499 A1* | 11/2005 | Read | 717/172 |
| 2005/0289538 A1* | 12/2005 | Black-Ziegelbein et al. | 717/177 |
| 2006/0020912 A1 | 1/2006 | Illowsky et al. | |
| 2006/0130056 A1* | 6/2006 | Bozak et al. | 717/174 |
| 2006/0179431 A1* | 8/2006 | Devanathan et al. | 717/168 |
| 2006/0271341 A1 | 11/2006 | Brown et al. | |
| 2007/0006217 A1* | 1/2007 | Tammana | 717/174 |
| 2007/0130208 A1* | 6/2007 | Bornhoevd et al. | 707/104.1 |
| 2007/0174437 A1 | 7/2007 | Kraus | |
| 2007/0214281 A1 | 9/2007 | Celik et al. | |

OTHER PUBLICATIONS

Eilam et al, Managing the Configuration Complexity of Distributed Applications in Internet Data Centers, Communications Magazine, IEEE, Mar. 2006,pp. 166-177, Retrieved on [Sep. 1, 2011], Retrieved from the Internet: URL<http://ieeexplore.ieee.org/stamp/stamp.jsp?tp=&arnumber=1607881>.*

Hoffman et al, Deployment and Configuration of Distributed Systems, Lecture Notes in Computer Science, 2005, vol. 3319, pp. 1-16, Retrieved on [Sep. 1, 2011], Retrieved from the Internet: URL<http://www.springerlink.com/content/muayunu6kcbjyteh/fulltext.pdf>.*

(Continued)

*Primary Examiner* — Thuy Dao
*Assistant Examiner* — Cheneca Smith
(74) *Attorney, Agent, or Firm* — Workman Nydegger

(57) ABSTRACT

A distributed application deployment engine uses declarative deployment data that describes deployment characteristics for application modules, and potential target environments. The engine uses the deployment data to potentially match a module to a deployment target. At some point, the modules may then be actually deployed on the identified deployment target. This may be performed for multiple modules in the distributed application, thereby deploying the distributed application in a distributed environment.

12 Claims, 4 Drawing Sheets

OTHER PUBLICATIONS

Weiss et al., "An Agent-based Distributed Multimedia Service Environment", IEEE 1995, (2 pages).

Global 360 Business Process Management Suite, 2007, (2 pages).

Grieser, Tim "Optimizing Business Performance with Enterprise Application Management", IDC Vendor Spotlight, Apr. 2007, (7 pages).

Jini Network Technology "Overview", copyright 1994-2007, http://www.sun.com/software/jini/.

Optimization (mathematics), page last updated Oct. 24, 2007, http://en.wikipedia.org/wiki/Optimization_%28mathematics%29.

* cited by examiner

ASSIGNMENT OF APPLICATION MODELS TO DEPLOYMENT TARGETS

BACKGROUND

Applications often contain multiple application modules. Distributed applications are deployed on multiple distributed physical machines. In other words, the various application modules are assigned to a particular machine in the distributed environment, and then the modules are installed and properly configured to operate on their corresponding assigned machine. As the distributed environment changes, the distributed application may be redeployed to maintain or improve performance.

Conventionally, such deployment or redeployment is commonly a manual process. For example, a distributed application may be associated with a text document that describes how and when to deploy and activate parts of an application and what to do when failures occur. An individual may then manually act as instructed in the text document to deploy (and redeploy) the distributed application.

BRIEF SUMMARY

A distributed application deployment engine described herein uses declarative deployment data that describes deployment characteristics for application modules, and potential target environments. The engine uses the deployment data to potentially match a module to a deployment target such as, for example, a physical machine and runtime combination. In some embodiments, the modules may then be actually deployed on the identified deployment target. This may be performed for multiple modules in the distributed application, thereby deploying the distributed application in a distributed environment.

This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

In accordance with embodiments described herein, a distributed application deployment engine uses declarative deployment data that describes deployment characteristics for application modules of a distributed application, and describes potential target environments for at least some of those modules. The engine uses the deployment data to potentially match a module to a deployment target such as, for example, a physical machine and runtime combination. In some embodiments, the module may then be actually deployed on the identified deployment target. This may be performed for multiple modules in the distributed application, thereby deploying the distributed application in a distributed environment.

First, after some introductory discussion regarding computing systems in general, a basic computing system will be described with respect to FIG. 1. Then, various embodiments of a deployment engine and its various embodiments of operation will be shown and described with respect to FIGS. 2 through 6.

Computing systems are now increasingly taking a wide variety of forms. Computing systems may, for example, be handheld devices, appliances, laptop computers, desktop computers, mainframes, distributed computing systems, or even devices that have not conventionally considered a computing system. In this description and in the claims, the term "computing system" is defined broadly as as including any device or system (or combination thereof) that includes at least one processor, and a memory capable of having thereon computer-executable instructions that may be executed by the processor. The memory may take any form and may depend on the nature and form of the computing system. A computing system may be distributed over a network environment and may include multiple constituent computing systems.

Figure 1:
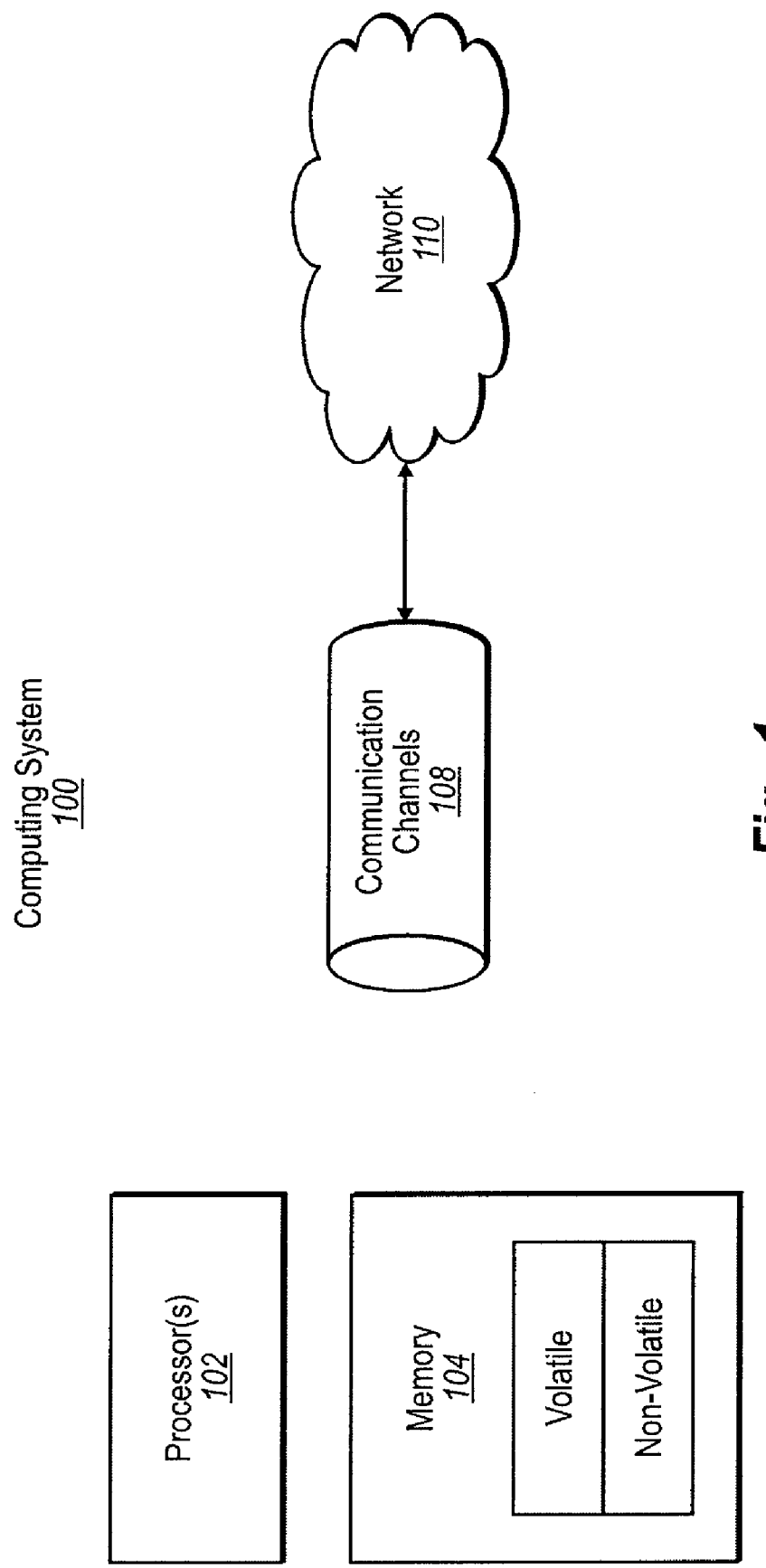
FIG. 1 illustrates a example computing system that may operate to deploy a distributed application, or onto which all or portions of a distributed application may be deployed.

Referring to FIG. 1, in its most basic configuration, a computing system 100 typically includes at least one processing unit 102 and memory 104. The memory 104 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well.

As used herein, the term "module" or "component" can refer to software objects or routines that execute on the computing system. The different components, modules, engines, and services described herein may be implemented as objects or processes that execute on the computing system (e.g., as separate threads). Software applications may have a number of constituent interrelated modules. In distributed applications, different modules of the application may be deployed on different physical machines.

In the description that follows, embodiments are described with reference to acts that are performed by one or more computing systems. If such acts are implemented in software, one or more processors of the associated computing system that performs the act direct the operation of the computing system in response to as having executed computer-executable instructions. An example of such an operation involves the manipulation of data. The computer-executable instructions (and the manipulated data) may be stored in the memory 104 of the computing system TOO.

Computing system 100 may also contain communication channels 108 that allow the computing system 100 to communicate with other computing systems over, for example, network 110. Communication channels 108 are examples of communications media. Communications media typically embody computer-readable instructions, data structures, program modules, or other data in a modulated data signal such as a carrier wave or other transport mechanism and include any information-delivery media. By way of example, and not limitation, communications media include wired media, such as wired networks and direct-wired connections, and wireless media such as acoustic, radio, infrared, and other wireless media. The term computer-readable media as used herein includes both storage media and communications media.

Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computer-readable media can comprise physical storage and/or memory media such as RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described herein. Rather, the specific features and acts described herein are disclosed as example forms of implementing the claims.

Figure 2:
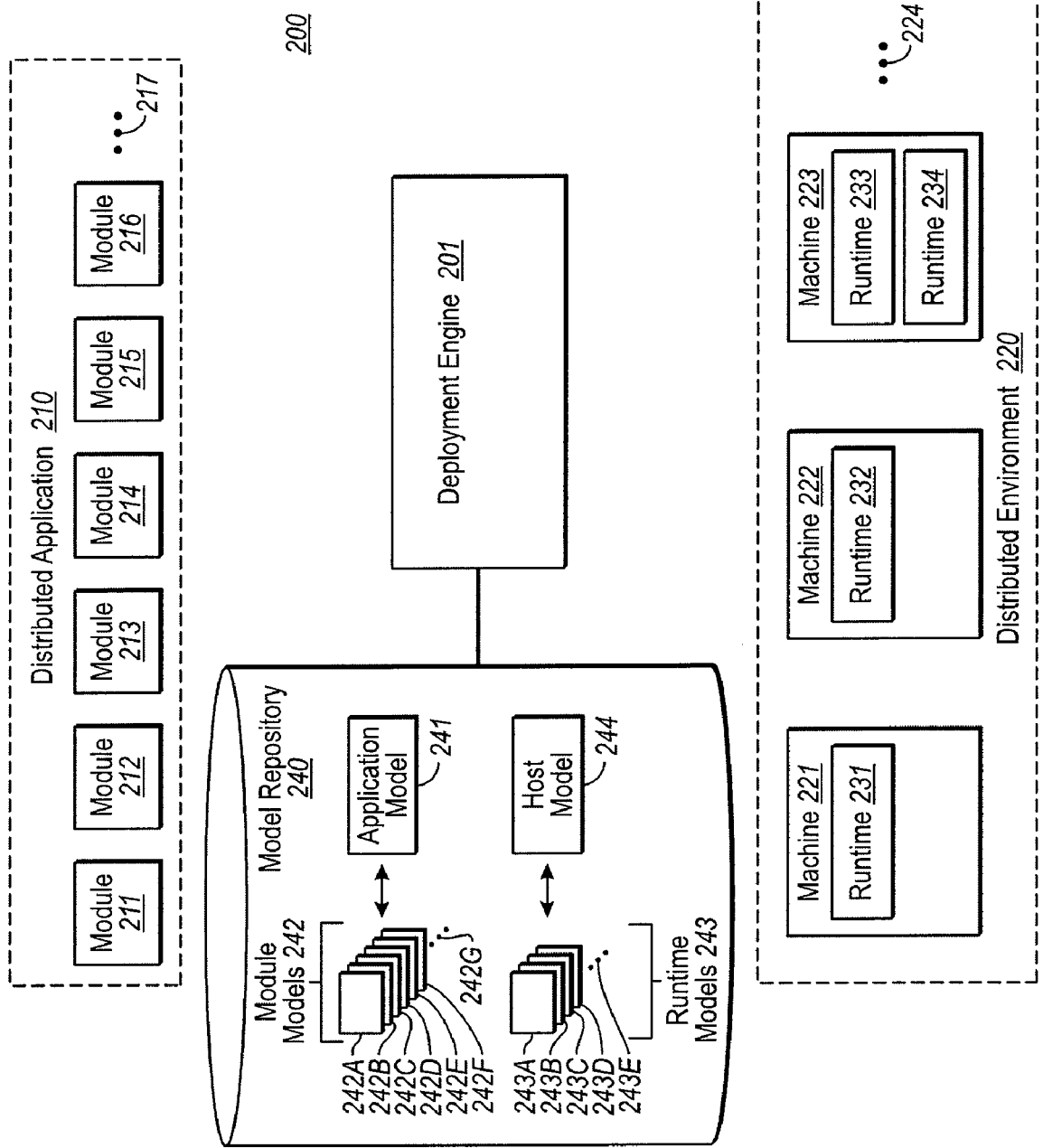
FIG. 2 illustrates a deployment environment in which a distributed application is deployed in a distributed environment.

FIG. 2 illustrates a deployment environment 200 showing a deployment engine 201 deploying a distributed application 210 into a distributed environment 220. The distributed application 210 includes multiple modules 211 through 216. The distributed environment 220 is illustrated as including physical machines 221 through 223.

The horizontal ellipses 217 and 224 represents that the deployment engine 201 may operate to deploy a distributed application 210 having any number (two or more without limit) of multiple modules to a distributed environment 220 that has any number (two or more without limit) of multiple machines. In fact, the deployment engine 201 is flexibly scalable to handle deployment of even the most complex of distributed applications to the most complex distributed environments, regardless of a as vast diversity in the functionality of such modules, and a potential diversity in the physical machines that compose the distributed environment.

Although not required, each physical machine 221 through 224 may be structured as described with respect to the computing system 100 of FIG. 1. In additional, the deployment engine 201 may also be implemented as an application (distributed or otherwise) present on such a computing system.

Each physical machine is illustrated as having therein a particular runtime. For instance, physical machine 221 is shown as running runtime 231, physical machine 222 is shown as running runtime 232, and physical machine 223 is shown as running two runtimes 233 and 234. When a module of an application runs on a computing system, that module will often call upon and use the functionality provided by a library of underlying modules that were already installed and operational on the computing system. Such libraries are often called "run-times" or "runtimes" because they are available for any application to use while running on the computing system that has the runtime deployed thereon. In that sense, runtimes may be considered to be part of the environment offered by a physical machine, albeit an environment that is provided by a library of software functionality. Examples of existing runtimes include SQL, SharePoint, BizTalk, and others. That said, the deployment engine 201 is extendible to runtimes that are not even developed yet.

The remainder of FIG. 2 will be described with respect to FIG. 3, which illustrates a flowchart of a method 300 that may be performed by the deployment engine 201. When the deployment process is directed by software, the deployment engine 201 may be an application running on a computing system (hereinafter also called the "deploying computing system"). The deploying as computing system may be the same as one or more of the physical machines in the distributed environment into which the distributed application is to be deployed (hereinafter called a "target machine"). However, the deploying computing system need not be one of the target machines. The deploying computing system may even perhaps be itself distributed, and may even reside partially within, and partially outside of, the distributed environment into which the application is to be deployed.

Figure 3:
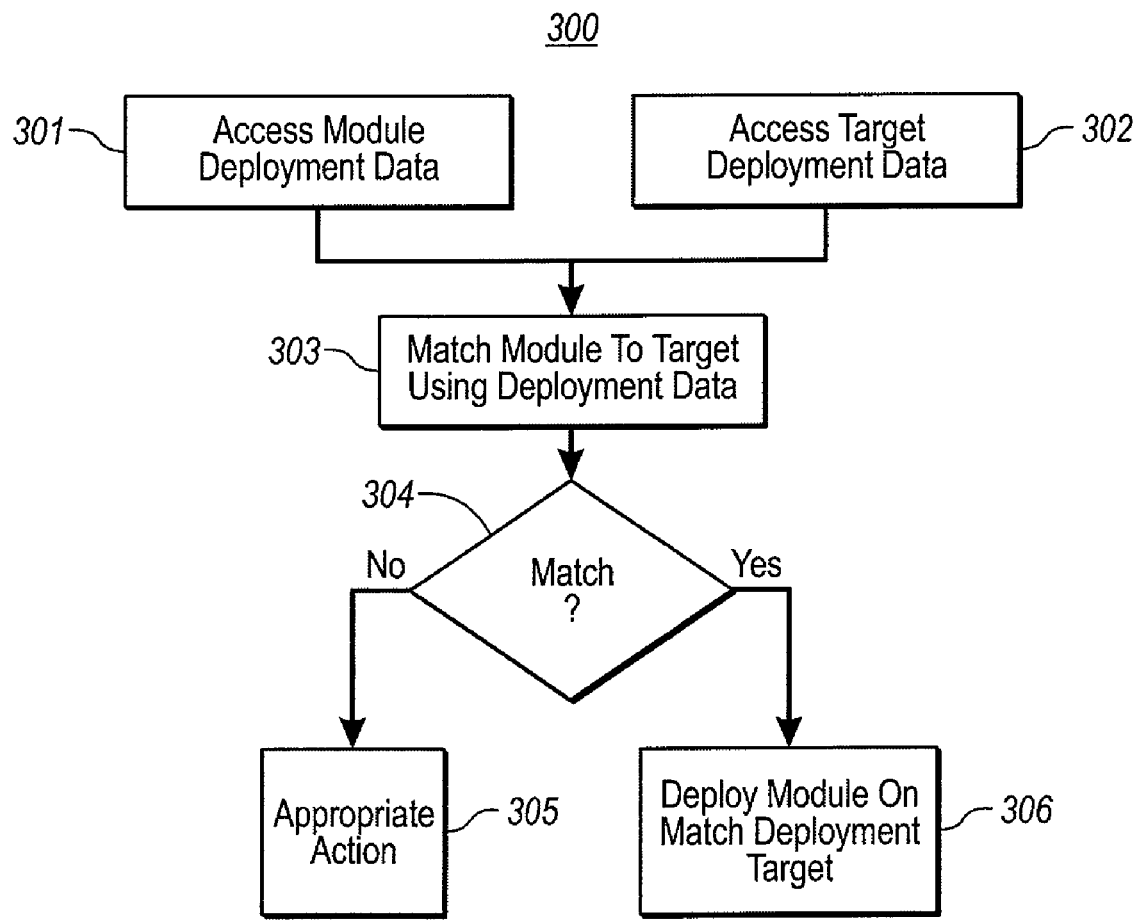
FIG. 3 illustrates a flowchart of a method for deploying a distributed application in a distributed environment in accordance with one embodiment.

When implemented in software, the method 300 of FIG. 3 may be executed by the deploying computing system in response to one or more processors of the deploying computing system accessing and executing instructions from one or more computer-readable media of a computer program product. The deployment method described herein may be performed for at least some of, and potentially all of, the modules in the distributed application 210.

FIG. 3 illustrates a flowchart of a method 300 for deploying modules of a distributed application into a distributed application using declarative deployment data. The method 300 may be performed for each of multiple modules in the distributed application, and may even be performed for all of the modules in the distributed application. The method 300 may be performed in parallel for the multiple modules, or may be performed sequentially, or a combination thereof.

Referring to FIG. 3, for each module in the distributed application, the deployment engine 301 accesses declarative deployment data for the module (act 301). For instance, referring to FIG. 2, the deployment engine 201 has access to a declarative model repository 240, that represents any memory and/or storage (such as a database) that may hold declarative data. In this description, the terms "declarative deployment data", "deployment model" and simply "model" may be used interchangeably. The module models 242 represent declarative deployment data for each of the modules 211 through 217. For instance, module models 242A through 242G represent module declarative deployment data for each of corresponding modules 211 through 217 of the distributed application 210. The application model 241 may also be used to identify constraints in assigning modules to deployment targets, and in properly deploying the modules to a corresponding target.

In this description, "declarative" data means data that is associated with a particular name (i.e., a name-value pair) where the association is implied by a schema. For instance, eXtensible Markup Language defines hierarchically structured data in which each node in the hierarchy includes an associated name-value pair. The document may be further defined by an appropriate schema. There may be schemas that define module models, application models, runtime models, host models, and so forth. Alternatively, one or more of the models may be defined by a single schema.

The declarative deployment data represents a plurality of deployment requirements for the module. In some cases, the deployment data represents that the module is to be deployed onto a specific machine. The declarative deployment data may also specify that the module is to be deployed on a different physical machine than one or more other identified modules. Alternatively or in addition, the declarative deployment data may specify that the module is to be deployed on the same physical machine as one or more other identified modules.

In this description, a module is deployed on a target machine when the module is made operational on the target machine. This may involve 1) installing the module on the target machine, 2) configuring the module so as to be operational, 3) performing any further action on the machine (such as a reboot of the physical as machine, and/or reinitializing of one or more applications on the physical machine), and/or 4) adjusting operating system data on the physical machine (such as a registration table).

Alternatively or in addition, the declarative deployment data may specify a preferred target machine onto which the module is to be deployed, even though the target machine might not be a required deployment target. The deployment data may not specify a required or preferred target machine at all, but may also specify desirable or required properties of a suitable deployment target machine. In that case, the declarative deployment data may also specify a prioritization for the property. For example, there might be one level of prioritization that indicates that a particular characteristic is required of the target machine, another to indicate that the characteristic is strongly preferred, another to indicate that the characteristic is moderately preferred, yet another to indicate that it is weakly preferred. Other granularities for specifying a degree of preference may also be used.

The declarative deployment data in general describes the requirements, capabilities and other properties of the module. While this is quite general, specific examples will now be provided.

The declarative deployment data for the module may specify a particular technology type of the module. For instance, a module may be of a database technology type, a Web Services technology type, a BizTalk technology type, a SharePoint technology type, and so forth for other existing and yet to be developed technology types.

The declarative deployment data may also specify a required runtime for the module. Example runtimes includes, SQL, IIS, WebServices, BizTalk, Sharepoint, etc. Runtimes generally support execution of module of one or more as technology types. For instance, SQL runtimes support modules of a database technology type.

The declarative deployment data may specify a security isolation requirement for the module. For example, this might include whether the module may be shared, requires an exclusive process, requires an exclusive machine, or other required or preferred security parameters.

The declarative deployment data may specify minimum required and/or preferred and maximum required or preferred resources such as, for example, CPU speed, numbers of CPUs, available and total memory space, available and total disk space, disk access speeds, network access latency and bandwidth, and so forth.

The declarative deployment data may also specify the availability requirements for the target machine. For instance, the module might require a 99.9999% uptime.

The declarative deployment data might also specify the scalability requirements for the module. For instance, the data might specify whether or not the module can be deployed to machine clusters.

Referring back to FIG. 3, before, after and/or during the time that the module declarative data is accessed (act 301), the deployment engine also access declarative deployment data for the various deployment targets (act 302) in the distribute environment (act 302). For instance, in FIG. 2, the deployment engine 201 accesses the host models 244 and the various runtime models 243 of the target machines. Accordingly, in one embodiment, the deployment data for each deployment target describes at least one characteristic of the physical machine and at least one characteristic of a runtime present on the physical machine. In the illustrated embodiment, perhaps there are runtime models 243A through 243D that describe characteristics of the various runtimes 231 through 234, respectively.

For instance, the host model 244 may identify a name for the physical machine, identify runtimes available on the physical machine, and may identify a license type for the physical machine. From this information, the deployment engine 201 may identify a name for physical machine 221, may determine that one runtime 231 is running on the physical machine 221, and may identify that the deployment engine 201 is properly licensed to deploy modules of the distributed application 210 on to the physical machine 221. Similarly, the deployment engine 201 may identify a name for physical machine 222, may determine that one runtime 232 is running on the physical machine 222, and may identify that the deployment engine 201 is properly licensed to deploy modules of the distributed application 210 on to the physical machine 222. Finally, the deployment engine 201 may identify a name for physical machine 223, may determine that two runtimes 233 and 234 are running on the physical machine 223, and may identify that the deployment engine 201 is properly licensed to deploy modules of the distributed application 210 on to the physical machine 223. Similar determinations may be made for yet other potential target machines in the distributed environment.

The host model 244 for the physical machine may also include properties such as computer model, a number of processors, a processor speed, an available memory, an available disk space, a memory access speed, or a disk access speed or the like. The host deployment models 244 may also specify that a total processing power used by all of the modules on a particular machine is to remain below a particular level, and/or that the total memory used by all of the modules on a particular machine is to remain below a particular level.

The runtime declarative deployment data 243 includes declarative deployment data for each runtime. For instance, runtime module 243A describes properties and requirements of the runtime 231. Likewise runtime models 243B through 243D describe properties and requirements of corresponding runtimes 232 through 234. Other runtime models may describe such information for yet other runtimes in the distributed environment 220 as represented by the ellipses 243E.

The runtime declarative deployment data 243 describes generally properties, characteristics, and/or requirements of the runtime. For instance, the runtime deployment models may include a technology type supported by the runtime, a version of the runtime, or a clustering support status for the runtime.

Returning to FIG. 3, once the relevant deployment models are accessed (act 301 and act 302), the deployment engine automatically performs a matching operation for the module to a particular deployment target (act 303). Recall that a particular combination of a runtime and a physical machine is one example of a deployment target. This step is performed automatically using the various deployment data of the modules, runtimes, and hosts. For each module, this matching operation may result in zero or more matches of the module to deployment targets.

If there is not a match (No in decision block 304), then appropriate action is taken (act 305). For example, a message may be sent to a user of the deployment engine 201 indicating that the constraints for the module need to be relaxed, or perhaps that a particular runtime needs to be first deployed or upgraded on a particular target machine before the module can be deployed on the machine, or the like. On the other hand, if there is a match (Yes in decision block 304), then the module is caused to be deployed on the matched deployment target (act 306). A method for deploying as will be described further below with respect to FIG. 6.

The deployment method 300 of FIG. 3 may be performed whenever the distributed application 210 is to be deployed in the deployment environment 220. This may be appropriate, for example, when the distributed application 210 is first deployed in the deployment environment 220. However, there may be circumstances in which the distributed application 210 should be redeployed into the distributed environment 220, even sometimes long after it was first deployed in that environment.

Figure 4:
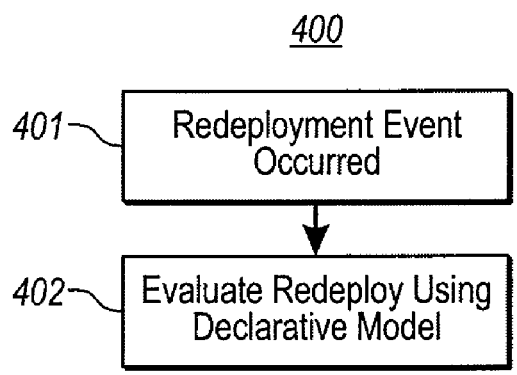
FIG. 4 illustrates a method for redeploying a distributed application in response to redeployment events.

FIG. 4 illustrates a flowchart of a method 400 for redeploying the distributed application into the distributed environment. First, it is determined that a redeployment event has occurred (act 401). The redeployment event may not necessarily result in redeployment of the distributed application, but may result in an automated evaluation regarding whether the redeployment should occur (act 402).

The redeployment event may be, for example, that a user has initiated a redeployment request that is received at the deployment engine. However, the redeployment event may also be dependent upon events unrelated to user requests. For instance, redeployment evaluations may be made at predetermined intervals. Alternatively or in addition, a redeployment evaluation may occur when the distributed application or the distributed environment has changed and/or when the declarative deployment models for the distributed application and the distributed environment have changed.

For example, perhaps the user has relaxed the deployment requirements of one or more modules or of the application as a whole. This might result in a different redeployment of the application, even though the application itself might not have changed. Alternatively, the changed application model or module model may have resulted from an actual change in the distributed application. For example, perhaps as the distributed application has been upgrade.

Furthermore, a reevaluation may be appropriate in the case of an actual change to the deployment model of the distributed environment. For example, perhaps the user realized that a particular runtime supports more than the technology types previously realized. The distributed environment may also have changed. For instance, there may have been a catastrophic event that reduce or eliminate some of the functionality of the underlying physical machines of the distributed environment. Also, perhaps one of the physical machines has been physical upgraded (e.g., with more memory, faster disks, or the like), or perhaps an additional, different, or upgraded runtime is installed and made operational on or more physical machines.

Figure 5:
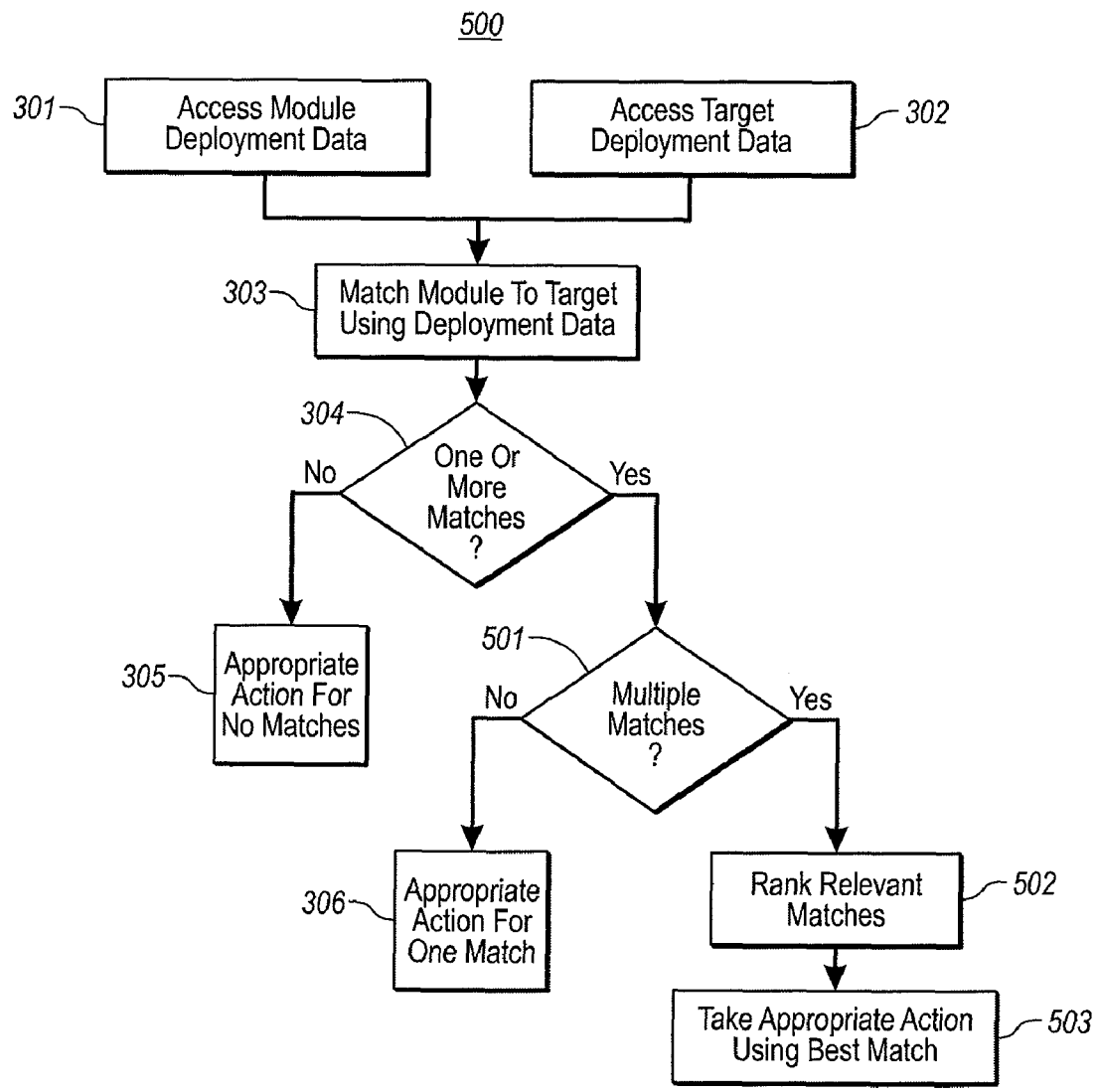
FIG. 5 illustrates a flowchart of a method for deploying a distributed application in a distributed environment in accordance with another embodiment.

If a redeployment event has occurred (act 401), the deployment evaluation of FIG. 3 may once again be performed (act 402). FIG. 5 describes an alternative deployment evaluation that performs also a ranking in the case that there are multiple solutions to the matching of a particular module to a deployment target. The method of FIG. 5 will now be described, and may also be performed in act 402 upon determining that a reevaluation event has occurred, or may simply be performed upon initial deployment of the distributed application.

FIG. 5 illustrates a flowchart of a method 500 for deploying a distributed application to a distributed environment. The method 500 of FIG. 5 is similar to the method 300 of FIG. 3. The illustrated portions of the method 500 include accessing of the declarative deployment data for the module (act 301) and the prospective deployment targets (act 302), and performing a matching operation of the modules to targets using the declarative deployment data (act 303). If there are no matches (No in decision block 304), then appropriate action may be taken given that there are no matches (act 305). Such appropriate action may be the same as described with respect to act 305 of FIG. 3.

However, if there are one or more matches (Yes in decision block 304), then it is determined whether there is but a single match of the module to a deployment target (decision block 501). If there is only one match (No in decision block 501) that resulted from the matching operation act 303, then appropriate action may be taken given that there is only one match (act 306). This may include simply deploying the module to the single matched deployment target, but may also include other actions such as, for example, relaxing the constraints until there are multiple matches between the module and deployment targets.

If there are multiple matches of a module to various deployment targets (Yes in decision block 501), then the resultant matches are ranked (act 502). The principles of the present invention are not limited to a particular ranking mechanism, nor is there any requirement regarding accuracy of such a ranking mechanism. The ranking mechanism may be automated, may be user driven, or may be a combination of user input and automation. Once the various resultant matches are ranked (act 502), then appropriate action is taken given the best match. For instance, the module may be deployed on the best match deployment target (act 503).

Figure 6:
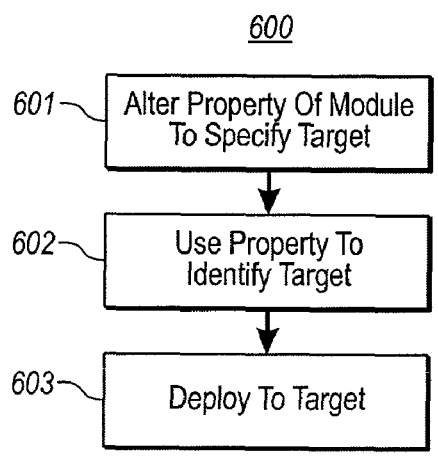
FIG. 6 illustrates a flowchart of a method for deploying a module of a distributed application onto a deployment target.

FIG. 6 illustrates a flowchart of a method 600 for deploying a module onto a deployment target. However, the principles of the present invention are not limited to the method 600 of FIG. 5. According to the method 600, once a deployment target for the module is identified, a property of the module may be altered to specify expressly or implicitly the deployment target (act 601). At the time of deployment, the property may be verified so that the deployment engine may also identify the deployment target for the module (act 602). The deployment engine may then cause the module to be deployed on the identified deployment target (act 603). This may be as done by having the module installed and configured on the deployment target and, if necessary, reconfiguring the target environment, or perhaps rebooting the target computing system and/or restarting one or more applications.

Accordingly, a flexible deployment mechanism is described in which a distributed application can be deployed to a distributed environment in a manner that is specified by a declarative deployment model. The distributed application may be deployed with relative ease using the same deployment mechanism should it prove beneficial.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer-implemented method for determining whether and how one or more modules of a distributed application may be distributed to one or more machines in a distributed computing environment, the method comprising:

storing in a model repository
deployment data for each module of the distributed application, the deployment data of each module identifying deployment requirements for the respective module of the distributed application, and
deployment data for a plurality of machines in the distributed environment, the deployment data for a given machine identifying at least one characteristic of the machine and at least one characteristic of a runtime for the given machine;

a distributed application deployment engine accessing from the model repository
deployment data for at least one module of the distributed application, and
deployment data for said plurality of machines in the distributed environment, each of said machines representing a potential deployment target for deployment of the at least one module of the distributed application;

the distributed application deployment engine thereafter automatically performing a matching operation for the at least one module using the deployment data accessed from the model repository for the at least one module and using the deployment data accessed from the model repository for said potential deployment targets;

if the deployment data for the at least one module cannot be matched to a deployment target, returning a message indicating one or more reasons why the deployment data cannot be matched, but if the deployment data for the at least one module is matched to one or more potential deployment targets, then selecting one of the targets and deploying the at least one module to that deployment target;

thereafter redeploying the distributed application by performing the following:

identifying that a redeployment event has occurred for at least one module of the distributed application; and upon determining that the redeployment event has occurred, performing the following for each of the plurality of modules in the distributed application:

the deployment engine accessing from the model repository the deployment data for each of the modules;

the deployment engine accessing from the model repository deployment data for a plurality of potential redeployment targets;

the deployment engine automatically performing a matching operation for one or more of the modules using the deployment data stored for each of the modules and using the deployment data for the potential redeployment targets to identify whether one or more of the potential redeployment targets match one or more of the modules; and if so, causing the modules which have a match to be redeployed on one of the matched redeployment targets.

2. The computer-implemented method in accordance with claim 1, wherein deploying the at least one module comprises:

an altering a property of the module to specify the deployment target;
using the property to identify where the module should be deployed; and
installing and configuring the module in the deployment target as specified by the altered property of the module.

3. A computer program product comprising a computer system hardware memory having thereon one or more computer-executable instructions which, when executed by one or more processors of the computing system, implements a method for determining whether and how one or more modules of a distributed application may be distributed to one or more machines in a distributed computing environment, and wherein the method comprises:

storing in a model repository
deployment data for each module of the distributed application, the deployment data of each module identifying deployment requirements for the respective module of the distributed application, and
deployment data for a plurality of machines in the distributed environment, the deployment data for a given machine identifying at least one characteristic of the machine and at least one characteristic of a runtime for the given machine;

a distributed application deployment engine accessing from the model repository
deployment data for at least one module of the distributed application, and
deployment data for said plurality of machines in the distributed environment, each of said machines representing a potential deployment target for deployment of the at least one module of the distributed application; and the distributed application deployment engine thereafter automatically performing a matching operation for the at least one module using the deployment data accessed from the model repository for the at least one module and using the deployment data accessed from the model repository for said potential deployment targets; and if the deployment data for the at least one module cannot be matched to a deployment target, returning a message indicating one or more reasons why the deployment data cannot be matched, but if the deployment data for the at least one module is matched to one or more potential deployment targets, then selecting one of the targets and deploying the at least one module to that deployment target;

thereafter redeploying the distributed application by performing the following:

identifying that a redeployment event has occurred for at least one module of the distributed application; and upon determining that the redeployment event has occurred, performing the following for each of the plurality of modules in the distributed application:

the deployment engine accessing from the model repository the deployment data for each of the modules;

the deployment engine accessing from the model repository deployment data for a plurality of potential redeployment targets;

the deployment engine automatically performing a matching operation for one or more of the modules using the deployment data stored for each of the modules and using the deployment data for the potential redeployment targets to identify whether one or more of the potential redeployment targets match one or more of the modules; and if so, causing the modules which have a match to be redeployed on one of the matched redeployment targets.

4. A computer program product in accordance with claim 3, wherein the redeployment event is user-initiated.

5. A computer program product in accordance with claim 3, wherein the redeployment event is detected without involving a user-initiated process.

6. A computer program product in accordance with claim 3, wherein the at least one characteristic of the machine includes at least one of a computer model, a number of processors, a processor speed, an available memory, an available disk space, a memory access speed, or a disk access speed.

7. A computer program product in accordance with claim 3, wherein the at least one characteristic of the runtime includes at least one of a technology type supported by the runtime, a version of the runtime, or a clustering support status for the runtime.

8. A computer program product in accordance with claim 3, wherein the deployment data for at least one of the modules identifies a machine that the module can be deployed on, whereas the deployment data for at least others of the modules does not expressly identify a machine that the module is to be deployed on.

9. A computer program product in accordance with claim 3, wherein the deployment data for one of the modules specifies that the module is to be deployed on a different machine than at least one other of the modules.

10. A computer program product in accordance with claim 3, wherein the deployment data for one of the modules specifies that the module is to be deployed on the same machine as at least one of the other modules.

11. A computer program product in accordance with claim 3, wherein the deployment data for at least one of the machines in the distributed environment specifies that the total processing power used by all of the modules deployed to that machine is to remain below a particular level.

12. A computer program product in accordance with claim 3, wherein the deployment data for at least one of the machines in the distributed environment specifies that the total memory used by all of the modules deployed to that machine is to remain below a particular level.

* * * * *